United States Patent
Kim et al.

(10) Patent No.: US 9,065,552 B2
(45) Date of Patent: Jun. 23, 2015

(54) METHOD AND APPARATUS OF TRANSMITTING DATA BASED ON FREQUENCY HOPPING

(71) Applicants: LG ELECTRONICS INC., Seoul (KR); POSTECH ACADEMY-INDUSTRY FOUNDATION, Gyeongsangbuk-do (KR)

(72) Inventors: Ki Jun Kim, Seoul (KR); Joon Ho Cho, Gyeongsangbuk-do (KR); Yeo Hun Yun, Gyeongsangbuk-do (KR); Jeong Ho Yeo, Gyeongsangbuk-do (KR); Min Uk Kim, Gyeongsangbuk-do (KR); Eun Ae Lee, Gyeongsangbuk-do (KR); Ju Bum Kim, Gyeongsangbuk-do (KR)

(73) Assignees: LG ELECTRONICS INC., Seoul (KR); POSTECH ACADEMY-INDUSTRY FOUNDATION, Gyeongsangbuk-Do (KR)

( * ) Notice: Subject to any disclaimer, the term of this patent is extended or adjusted under 35 U.S.C. 154(b) by 0 days.

(21) Appl. No.: 14/259,880

(22) Filed: Apr. 23, 2014

(65) Prior Publication Data
US 2014/0341259 A1 Nov. 20, 2014

Related U.S. Application Data

(60) Provisional application No. 61/822,922, filed on May 14, 2013.

(51) Int. Cl.
*H04B 1/00* (2006.01)
*H04B 1/713* (2011.01)
*H04B 1/707* (2011.01)

(52) U.S. Cl.
CPC ............... *H04B 1/713* (2013.01); *H04B 1/707* (2013.01)

(58) Field of Classification Search
CPC ........................................................ H04B 1/713
See application file for complete search history.

(56) References Cited

U.S. PATENT DOCUMENTS

| | | | |
|---|---|---|---|
| 2004/0178954 A1* | 9/2004 | Vook et al. | 342/383 |
| 2005/0281317 A1* | 12/2005 | Oh et al. | 375/132 |
| 2006/0251198 A1* | 11/2006 | Ma et al. | 375/350 |
| 2008/0008206 A1* | 1/2008 | Cho et al. | 370/430 |
| 2010/0039928 A1* | 2/2010 | Noh et al. | 370/210 |
| 2010/0128594 A1* | 5/2010 | Ahn et al. | 370/210 |
| 2013/0100920 A1* | 4/2013 | Nakamura et al. | 370/329 |

* cited by examiner

*Primary Examiner* — Sam K Ahn
*Assistant Examiner* — Fabricio R Murillo Garcia
(74) *Attorney, Agent, or Firm* — Lee, Hong, Degerman, Kang & Waimey (57) ABSTRACT

A method of transmitting a signal based on multi-stream CPDMA may include: allocating a plurality of data symbols to each of a plurality of data streams based on a frequency hopping pattern; applying a DFT function and a M-times repetition function to the data symbol allocated to the each of the plurality of data streams; applying a spectral weighting vector to the each of the plurality of data streams applying the DFT function and the M-times repetition function; and generating the signal based on the multi-stream CPDMA by performing an IDFT function and a cyclic prefix adding procedure with respect to the plurality of data streams to which the spectral weighting vector is applied, in which the spectral weighting vector is a vector for determining a frequency band in which the each of the plurality of data streams is used.

8 Claims, 9 Drawing Sheets

METHOD AND APPARATUS OF TRANSMITTING DATA BASED ON FREQUENCY HOPPING

CROSS-REFERENCE TO RELATED APPLICATIONS

Pursuant to 35 U.S.C. §119(e), this application claims the benefit of U.S. Provisional Patent Application Ser. No. 61/822,922, filed on May 14, 2013, the contents of which are hereby incorporated by reference herein in its entirety.

BACKGROUND OF THE INVENTION

1. Field of the Invention

The present invention relates to a radio communication, and more particularly, to method and apparatus of transmitting data based frequency hopping.

2. Related Art

A frequency hopping spread spectrum (FHSS) method is a kind of spread-spectrum technique in which a signal is transmitted while changing a carrier frequency by using a pseudo-random sequence.

The FHSS may transmit and receive data by randomly hopping a frequency channel based on a random hopping sequence throughput a plurality of channels. As one of embodiments of the FHSS, a pre-scanning for a target channel may be performed before randomly channel hopping is performed. When noise or radio interference exists in a target channel to be hopped, hopping to another channel may be automatically performed by a system by avoiding the corresponding channel. The FHSS method has advantages that security is excellent, the FHSS is strong to narrowband interference, and a frequency channel diversity gain is large, as compared with a transmission method using a fixed frequency. Particularly, due to a characteristic that the security is excellent, the FHSS was referred to as a candidate for military communication.

A single-stream cycle period division multiple access (CPDMA) implemented by a block transmission method using a cyclic prefix may transmit data symbols having a correlation by loading into different subcarriers which are separated from a frequency axis at a regular distance. The CPDMA may be strong to narrowband interference and have large frequency channel diversity. Since a structure for implementing the single stream CPDMA includes a carrier weighting filter, a frequency used for transmitting a signal of a predetermined block may be arbitrarily selected.

SUMMARY OF THE INVENTION

An object of the present invention is to provide a method of transmitting data based on frequency hopping.

Another object of the present invention is to provide an apparatus of performing the method of transmitting data based on frequency hopping.

In accordance with an embodiment of the present invention, a method of transmitting signals based on a multi-stream cycle period division multiple access (CPDMA) may include: allocating a plurality of data symbols to a plurality of data streams based on a frequency hopping pattern by a user equipment, respectively; applying a discrete fourier transform (DFT) function and a M-times repetition function to the data symbol allocated to each of the plurality of data streams by the user equipment; applying a spectral weighting vector to each of the plurality of data streams applying the DFT function and the M-times repetition function by the user equipment; and generating the signal based on the multi-stream CPDMA by performing an inverse discrete fourier transform (IDFT) function and a cyclic prefix adding procedure with respect to the plurality of data streams to which the spectral weighting vector is applied, by the user equipment, in which the spectral weighting vector is a vector for determining a frequency band in which each of the plurality of data streams is used.

In accordance with another embodiment of the present invention, a user equipment operating in a radio communication network may include: a radio frequency (RF) unit implemented for transmitting or receiving a radio signal; and processor selectively connected with the RF unit, in which the processor is implemented to allocate a plurality of data symbols to a plurality of data streams based on a frequency hopping pattern by a user equipment, respectively, apply a discrete fourier transform (DFT) function and a M-times repetition function to the data symbol allocated to each of the plurality of data streams by the user equipment, apply a spectral weighting vector to each of the plurality of data streams applying the DFT function and the M-times repetition function by the user equipment, generate the signal based on the multi-stream CPDMA by performing an inverse discrete fourier transform (IDFT) function and a cyclic prefix adding procedure with respect to the plurality of data streams to which the spectral weighting vector is applied, by the user equipment, and the spectral weighting vector is a vector for determining a frequency band used by each of the plurality of data streams.

An embodiment of the present invention discloses a method of performing frequency hopping within one block based on the multi-stream CPDMA. By using the method, there are advantages of obtaining a diversity of a symbol unit and simultaneously, preventing deterioration of a transmission speed, and there are characteristic of high security, an increased diversity gain, strong to narrowband interference which are characteristics of a frequency hopping method. Further, additional performance improvement may be achieved by allocating symbols having correlation to different frequencies like a CPDMA signal. Further, the performance deterioration due to a frequency selective characteristic of a channel may be flexibly overcome by adding a simple receiver structure (1-tap frequency-axial equalizer), and in a transceiver structure, multiplexing may be easily implemented only by simply controlling a parameter.

DESCRIPTION OF EXEMPLARY EMBODIMENTS

A user equipment (UE) may be fixed or have mobility, and may be called other terms such as a mobile station (MS), a mobile user equipment (MT), a user terminal (UT), a subscriber station (SS), a radio device, a personal digital assistant (PDA), a radio modem, and a handheld device.

A base station means a fixed station which communicates with the user equipment, and may be called other terms such as an evolved-NodeB (eNB), a base transceiver system (BTS), and an access point.

In order to perform a communication in a frequency hopping spread spectrum (FHSS) method, a time staying in a predetermined frequency is called a dwell time. Generally, as the dwell time is decreased, a diversity of a symbol unit may be obtained, as a result, it is advantageous in a performance aspect. However, unlike a conventional FHSS transmission method, since frequency hopping using a block transmission method based on a single-stream cycle period division multiple access (CPDMA) may not change a frequency used in one block, the dwell time is increased and thus the diversity of the symbol unit is not obtained. One block may mean an information unit of data of up-link transmission or down-link transmission by the UE or the base station.

A problem of the single-stream CPDM may be solved by reducing a length of the transmission block. However, due to a characteristic of a cyclic prefix to use a length larger than a maximum delay spread of the channel, the length of the cyclic prefix needs to be maintained. When the length of the transmission block is reduced while maintained the cyclic prefix, an average data transmission speed, that is, a data throughput is decreased.

Hereinafter, an embodiment of the present invention discloses a block transmission method based on a multi-stream CPDMA in which transmission may be performed by performing average data frequency hopping in one block.

Figure 1:
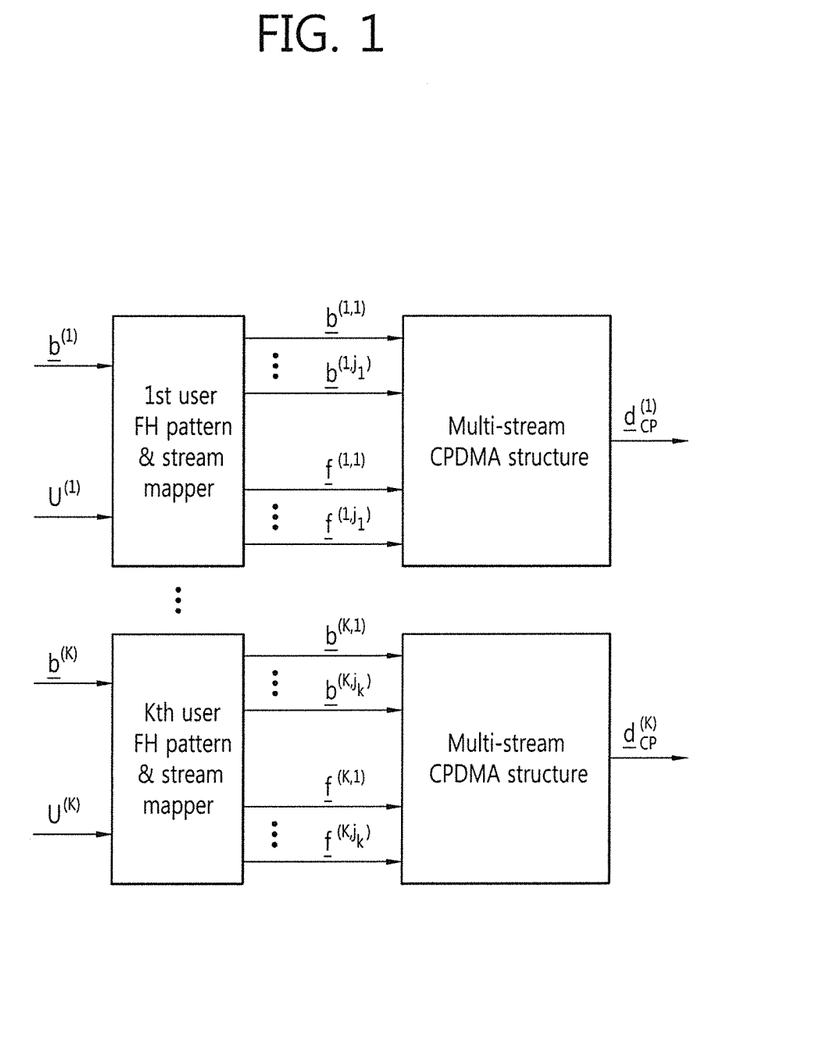
FIG. 1 is a schematic diagram illustrating a block transmission method according to an embodiment of the present invention.

FIG. 1 is a schematic diagram illustrating a block transmission method according to an embodiment of the present invention.

Referring to FIG. 1, $b^{(i)}$ represents a data symbol of an i-th user, and $U^{(i)}$ represents a frequency hopping pattern of the i-th user. $U^{(i)}$ may be determined based on the following Equation 1.

$$[U^{(i)}]_{k,n} = \begin{cases} 1 & \text{(If there exists a } i^{th} uesr \text{ signal residing in } k^{th} \text{ frequency bin at symbol time } n.) \\ 0 & \text{(otherwise.)} \end{cases} \quad \text{[Equation 1]}$$

Referring to Equation 1, when a signal of the i-th user exists in a k-th frequency bin for a symbol time n, a value of the frequency hopping pattern may have 1.

According to the embodiment of the present invention, a j-th stream $b^{(i,j)}$ may be determined based on the data symbol $b^{(i)}$ of the i-th user and the frequency hopping pattern of the i-th user. A frequency hopping pattern $U^{(i)}$ may be used in order to map the signal $b^{(i)}$ of the i-th user as a multi-stream symbol $b^{(i,1)}, \ldots, b^{(i,J_i)}$. A method of mapping the signal $b^{(i)}$ of the i-th user as a multi-stream symbol $b^{(i,1)}, \ldots, b^{(i,J_i)}$ will be described below according to the frequency hopping pattern $U^{(i)}$.

As a detailed example, when a data symbol $b^{(1)}$ and a frequency hopping pattern $U^{(1)}$ of a first user are input, the data symbol of the first user may be mapped as j multi-streams.

In the data symbol of the user, as the j multi-streams, a frequency allocated to each of the j multi-streams may be determined based on a spectral weighting vector $f^{(i,j)}$ corresponding to each stream. The j multi-streams may generate a CPDMA signal $d_{CP}^{(i)}[m]$ according to a signal generation procedure based on the multi-stream CPDMA to be described below.

Both the user and the k-th user may perform the above procedure. A data symbol of the k-th user may be mapped as j multi-streams. A frequency allocated to each of the j multi-streams may be determined based on a spectral weighting vector $f^{(i,j)}$ corresponding to each stream.

That is, a data symbol for a predetermined user is mapped in the multi-stream, and a frequency band to be used by each stream is determined based on spectral weighting vector information allocated to each stream included in the multi-stream to generate a CPDMA signal. A process of generating the CPDMA signal will be described below in detail.

Figure 2:
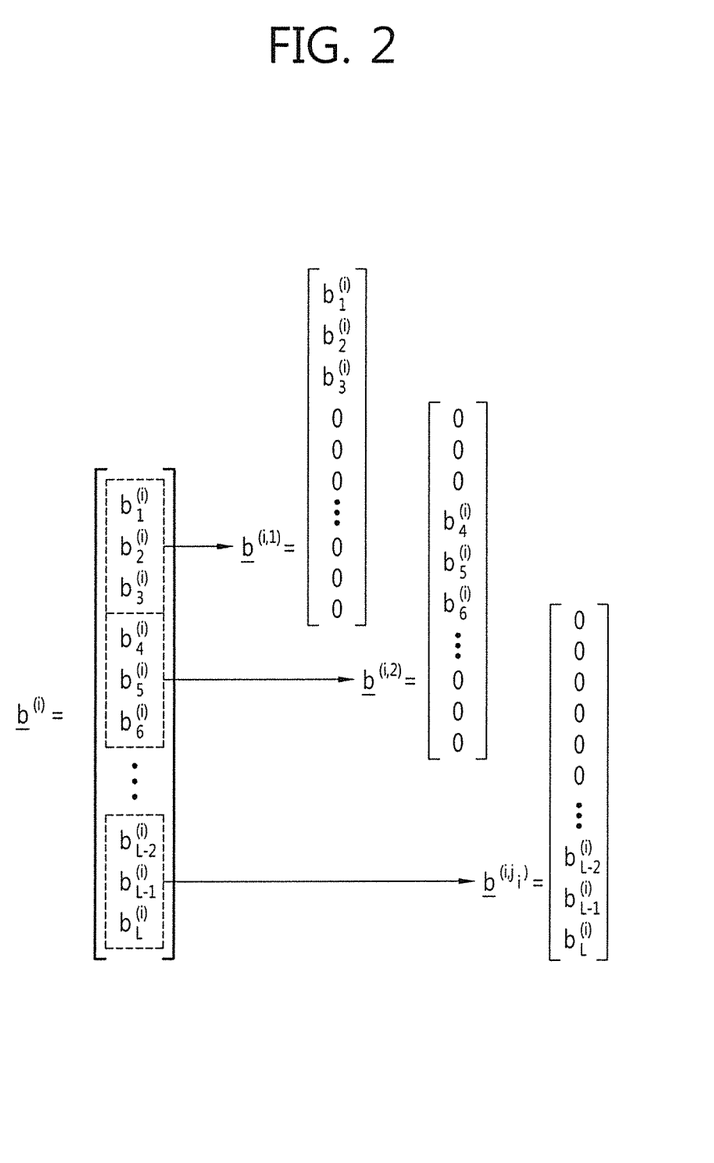
FIG. 2 is a schematic diagram illustrating a method of mapping a user's data symbol as a multi-stream symbol according to the embodiment of the present invention.

FIG. 2 is a schematic diagram illustrating a method of mapping a user's data symbol as a multi-stream symbol according to the embodiment of the present invention.

In FIG. 2, a method of determining the data symbol $b^{(i,j)}$ of the i-th user mapped in the j-th stream based on the data symbol $b^{(i)}$ of the i-th user and the frequency hopping pattern $U^{(i)}$ of the i-th user is illustrated.

For example, it may be assumed that L data symbols of the i-th user exist. The L data symbols may be referred to as one block. In this case, the L data symbols may be divided into a plurality of streams based on the frequency hopping pattern. For example, like FIG. 2, three symbols of the L data symbols may be mapped in one stream. For example, $b_1^{(i)}, b_2^{(i)}, b_3^{(i)}$ of the data symbols of the i-th user may be mapped in a first stream, and $b_4^{(i)}, b_5^{(i)}, b_6^{(i)}$ of the data symbols of the i-th user may be mapped in a second stream.

Figure 3:
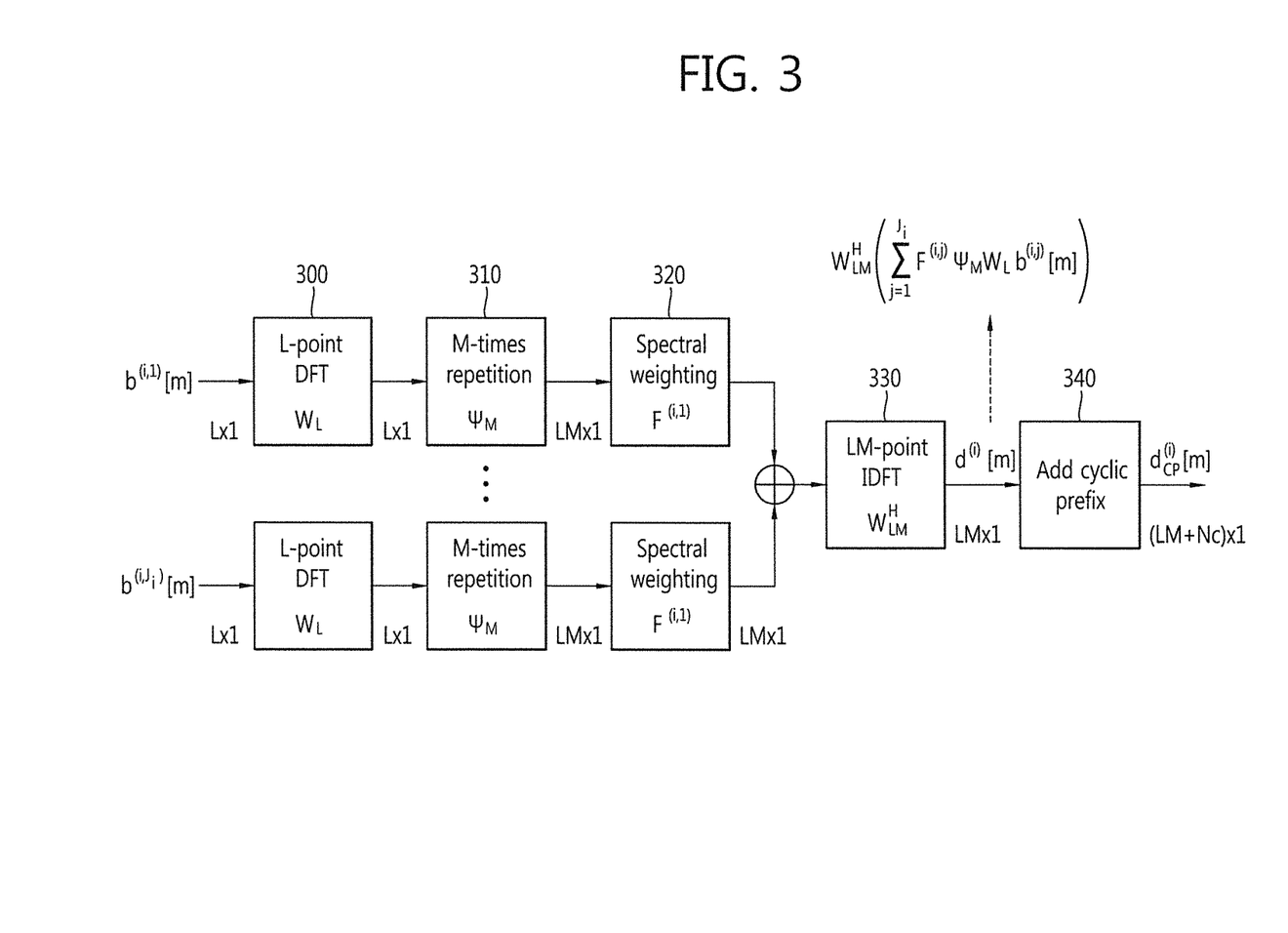
FIG. 3 illustrates a method of generating a CPDMA signal based on a multi-stream CPDMA according to the embodiment of the present invention.

FIG. 3 illustrates a method of generating a CPDMA signal based on a multi-stream CPDMA according to the embodiment of the present invention.

Referring to FIG. 3, a frequency allocated to the stream in which the data symbol $b^{(i,j)}$ of the user is mapped may be determined by controlling a spectral weighting filter $F^{(i,j)}$ which is a diagonal matrix. Herein, i, j represent a user index and a stream index, respectively. The CPDMA signal may be generated by the following procedure.

First, with respect to a data symbol of a user input for generating the CPDMA signal, a procedure of applying a spectral weighted value 320 may be performed after L-point discrete fourier transform (DFT) 300 is performed ($W_L$), and M-times repetition $\Psi_M$ 310 is performed. The procedure may be performed with respect to each stream included in the multi-stream. As described above, the frequency allocated in the stream mapped through the procedure of applying the spectral weighting filter $F^{(i,j)}$ may be determined. That is, in order to generate the multi-stream CPDMA signal, the aforementioned procedures may be separately performed with respect to each stream.

Multi-streams to which each spectral weighted value is applied are combined, and thereafter, LM-point inverse discrete fourier transform (IDFT) $W_{LM}^H$ 330 may be performed. A signal generated after performing the LM-point IDFT may be expressed as the following Equation 2.

$$d^{(i)}[m] = W_{LM}^H \left( \sum_{j=1}^{J_i} F^{(i,j)} \Psi_M W_L b^{(i,j)}[m] \right)$$ [Equation 2]

$$b^{(i)}[m] \square \begin{bmatrix} b_0^{(i)}[m] \\ b_1^{(i)}[m] \\ \vdots \\ b_{L-1}^{(i)}[m] \end{bmatrix},$$

$$\Psi_M \square \begin{bmatrix} I_L \\ I_L \\ \vdots \\ I_L \end{bmatrix},$$

and $$d^{(i)}[m] \square \begin{bmatrix} d_0^{(i)}[m] \\ d_1^{(i)}[m] \\ \vdots \\ d_{LM-1}^{(i)}[m] \end{bmatrix}.$$

A cyclic prefix (CP) 340 is added to a signal $d^{(i)}[m]$ generated after performing the LM-point IDFT to generate the CPDMA signal $d_{CP}^{(i)}[m]$.

Decoding for the signal received by the method of generating the signal may be performed in opposition to the procedure illustrated in FIG. 3.

A time-axial symbol waveform vector represented when the CPDMA signal generated by the above method is linearly modulated by using a transmission filter p(t) may be expressed as the following Equation 3.

$$s^{(i,j)}(t) = (W_{LM}^H F^{(i,j)} \Psi_M W_L)^T p(t)$$ [Equation 3]

$$= \begin{bmatrix} \hat{f}_0^{(i,j)} & \hat{f}_1^{(i,j)} & \cdots & \hat{f}_{LM-1}^{(i,j)} \\ & M \text{ circular shift of } 1st \text{ row} \\ & & \vdots \\ & (L-1)M \text{ circular shift of } 1st \text{ row} \end{bmatrix}$$

$$\begin{bmatrix} p(t) \\ p(t-T) \\ \vdots \\ p(t-(LM-1)T) \end{bmatrix}$$

Here, $$\hat{f}^{(i,j)} \triangleq [\hat{f}_0^{(i,j)} \quad \hat{f}_1^{(i,j)} \quad \cdots \quad \hat{f}_{LM-1}^{(i,j)}] = W_{LM} f(i,j).$$

Equation 3 represents that an n-th data symbol $b_n^{(i,j)}$ of the data symbol vector $b^{(i,j)}$ transmits a waveform used by a 0-th data symbol $b_0^{(i,j)}$ by using a waveform which is circular-shifted by nMT from a time axis. In this case, M and T are a repetition number and a symbol cycle which are used in the CPDMA, respectively.

Figure 4:
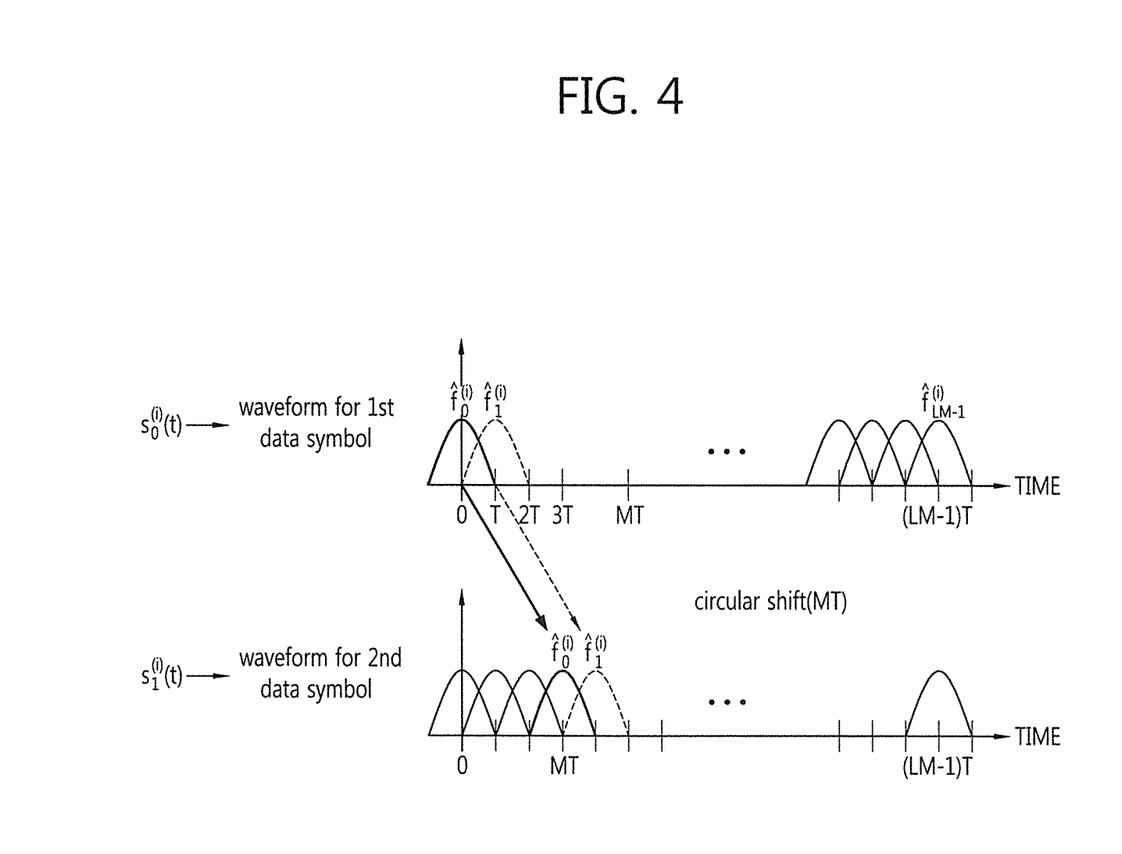
FIG. 4 is a schematic diagram illustrating a wave for a data symbol according to the embodiment of the present invention.

FIG. 4 is a schematic diagram illustrating a waveform for a data symbol according to the embodiment of the present invention.

Referring to FIG. 4, $s_0^{(i)}(t)$ may be a waveform used in a first data symbol, and $s_1^{(i)}(t)$ may be a waveform used in a second data symbol. The waveform $s_1^{(i)}(t)$ used in the second data symbol represents a case where the waveform $s_0^{(i)}(t)$ used in the first symbol is circular-shifted by MT.

The CPDMA signal may determine information regarding a time and a frequency used for the CPDMA signal based on the spectral weighting vector $F^{(i,j)} = \text{diag}(f^{(i,j)})$. That is, a non-zero time resource and a non-zero frequency resource of the CPDMA signal may be determined.

That is, according to the embodiment of the present invention, the CPDMA signal using only a predetermined frequency band at a predetermined time may be created through the aforementioned procedure. In the case of using a single-stream CPDMA structure, since the signal of one user is created by using only a spectral weighting filter, a frequency area for one block is fixed. Accordingly, as the single-stream CPDMA structure, the frequency hopping may not be implemented within one block. However, like the embodiment of the present invention, in the case of using a multi-stream CPDMA structure, the frequency hopping may be implemented even within one block by using a time-axial/frequency-axial characteristic of the aforementioned CPDMA signal. To this end, a design of a discrete-time vector which is band-limited in the frequency axis and simultaneously almost time-limited in the time axis is required.

Hereinafter, in the embodiment of the present invention, a frequency hopping method within a block using the multi-stream CPDMA structure will be described.

Hereinafter, in the embodiment of the present invention, a multi-stream CPDMA structure is assumed as L=128, M=8, and for convenience of description, the number of multi-streams is assumed as 4. In this case, a spectral weighting vector $f^{(i,j)}$ used for a j-th stream may be determined as the following Equation 4.

$$f^{(i,j)} = \text{Trunc}(\text{DFT}(\text{Trunc}(\text{IDFT}(g^{(i,j)}),\epsilon)),\epsilon)$$ [Equation 4]

Figure 6:
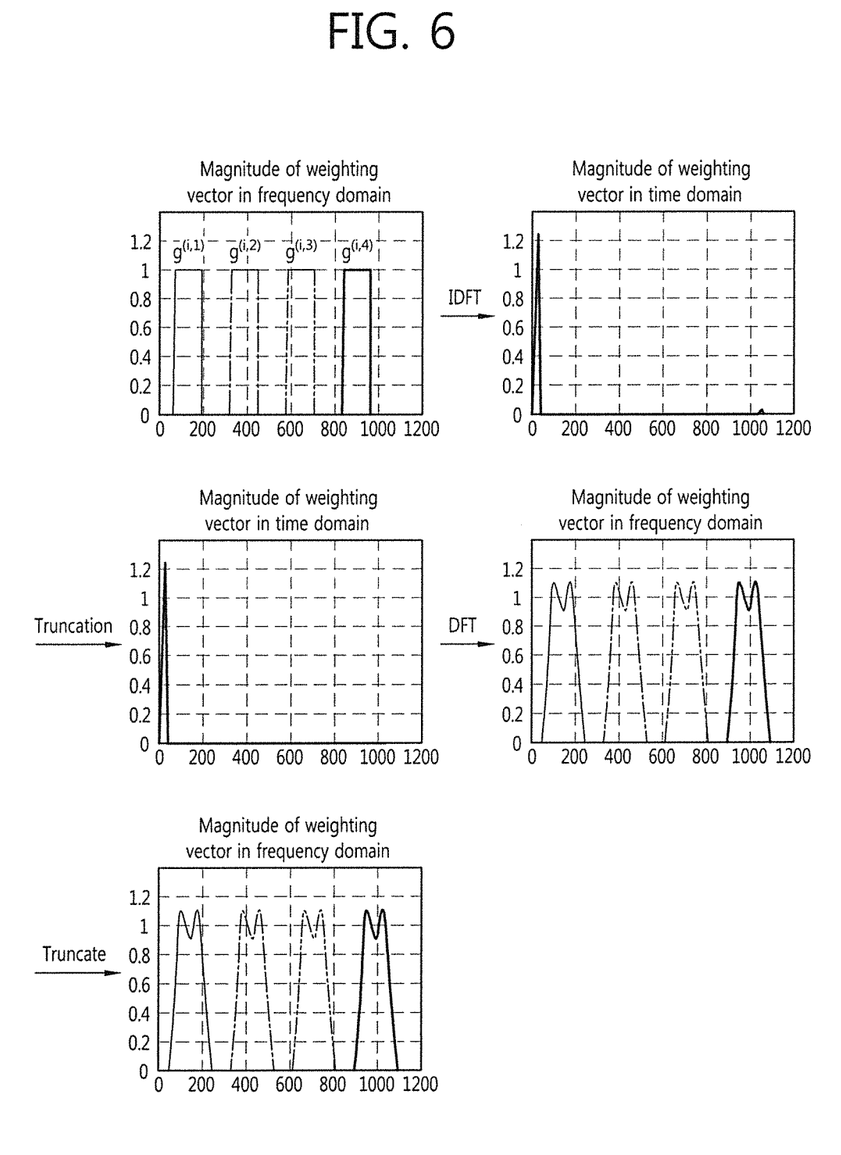
FIG. 6 is a schematic diagram illustrating a process of determining a spectral weighting vector according to the embodiment of the present invention.

In this case, $g^{(i,j)}$ is defined as illustrated in FIG. 6, and a vector-valued function Trunc(•, •) is defined as the following Equation 5.

Figure 5:
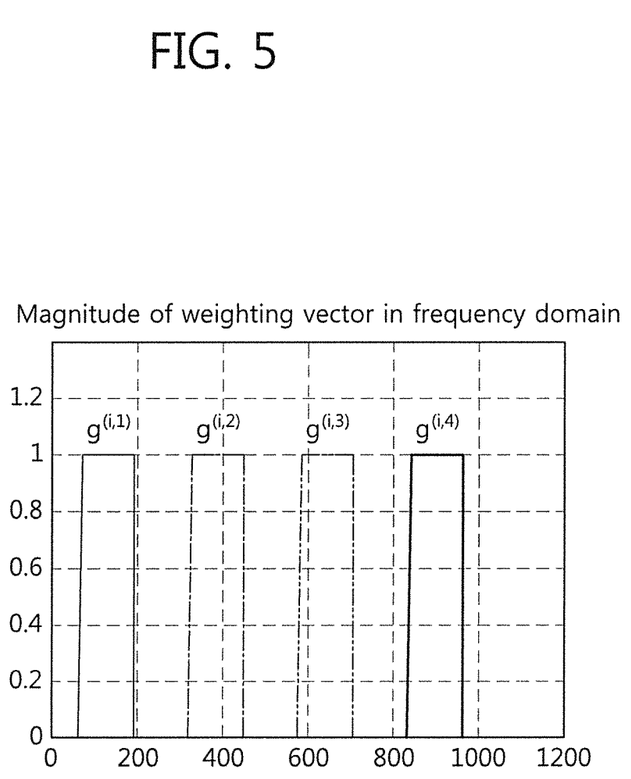
FIG. 5 illustrates $g^{(i,j)}$ for determining a spectral weighting vector according to the embodiment of the present invention.

FIG. 5 illustrates $g^{(i,j)}$ for determining a spectral weighting vector according to the embodiment of the present invention.

Referring to FIG. 5, $g^{(i,j)}$ represents a magnitude of a weighting vector in a frequency domain.

$$[\text{Trunc}(x, \epsilon)]_1 = \begin{cases} x_1, & x_1 \geq \epsilon \\ 0, & x_1 < \epsilon \end{cases}$$ [Equation 5]

In Equation 5, Trunc(x, ϵ) means that an entry of a vector x having a smaller value than ϵ is 0. That is, Trunc(x, ϵ) is a process of removing a signal portion having negligibly small energy.

FIG. 6 is a schematic diagram illustrating a process of determining a spectral weighting vector according to the embodiment of the present invention.

In FIG. 6, a process of determining the spectral weighting vector illustrated in Equation 4 is illustrated.

Referring to FIG. 6, a truncation procedure may be performed after changing information on the weighting vector into a time domain by performing the IDFT with respect to $g^{(i,j)}$. The information is changed into a frequency domain signal again by performing the DFT after performing the truncation procedure, and then the truncation procedure may be performed again.

In the case of using the spectral weighting vector $f^{(i,j)}$ obtained by the above method, the multi-stream CPDMA signal which is band-limited in the frequency axis and almost time-limited in the time axis may be generated. A waveform of the signal illustrated in the time axis and the frequency time may be illustrated in FIG. 7 with the course of time.

Figure 7:
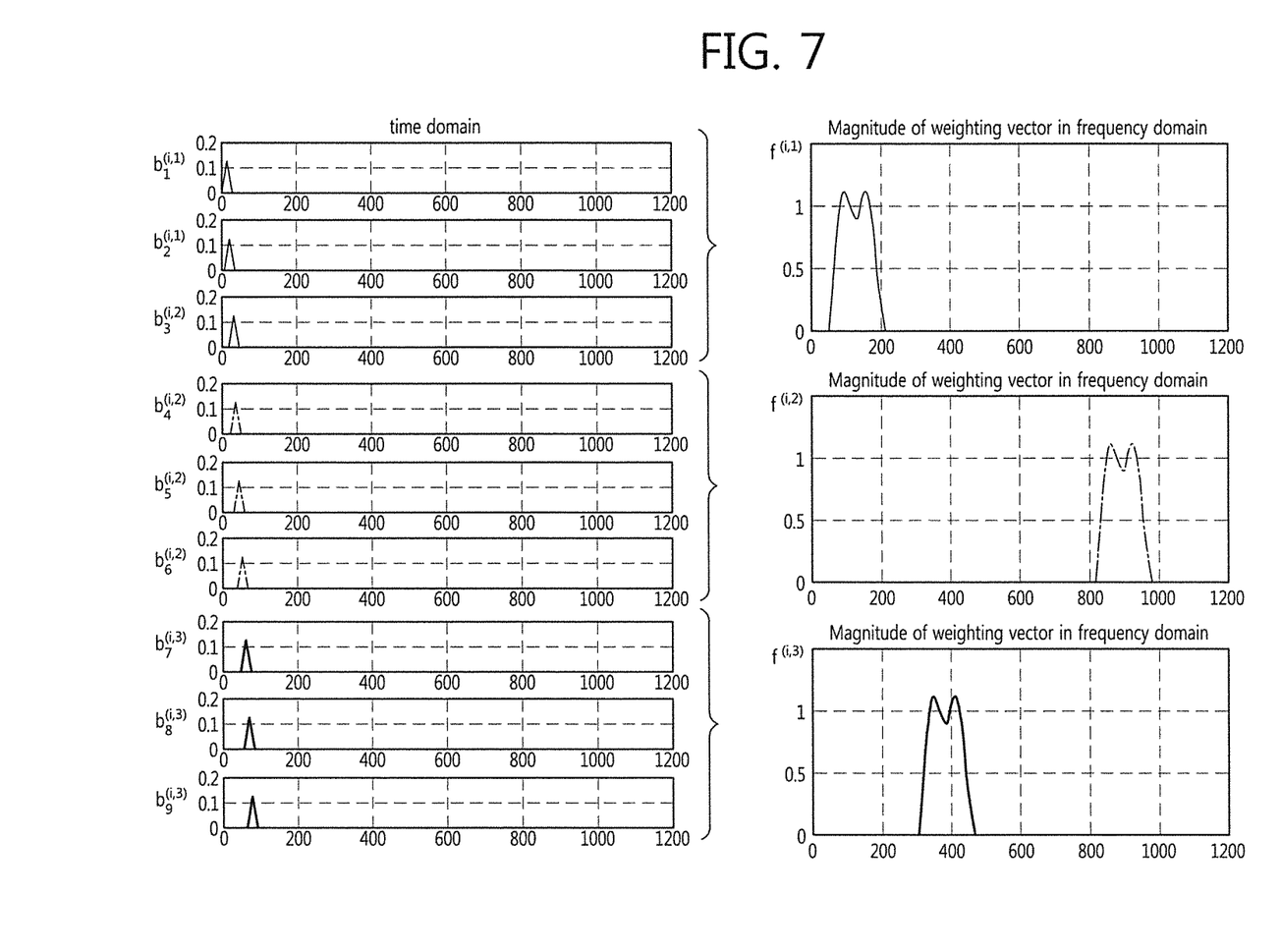
FIG. 7 is a schematic diagram illustrating a method of transmitting data based on a multi-stream CPDMA signal according to the embodiment of the present invention.

FIG. 7 is a schematic diagram illustrating a method of transmitting data based on a multi-stream CPDMA signal according to the embodiment of the present invention.

Referring to FIG. 7, in the case of a first stream corresponding to $b_1^{(i,1)}$, $b_2^{(i,1)}$, $b_3^{(i,1)}$, the first stream may be transmitted through a first frequency band determined based on $f^{(i,1)}$ at a first time. In the case of a second stream corresponding to $b_4^{(i,2)}$, $b_5^{(i,2)}$, $b_6^{(i,2)}$, the second stream may be transmitted through a second frequency band determined based on $f^{(i,2)}$ at a second time. In the case of a third stream corresponding to $b_7^{(i,3)}$, $b_8^{(i,3)}$, $b_9^{(i,3)}$, the third stream may be transmitted through a third frequency band determined based on $f^{(i,3)}$ at a third time. That is, according to the embodiment of the present invention, the frequency hopping is performed within one block as the time is changed and thus the data may be transmitted.

Hereinafter, in the embodiment of the present invention, a process in which the data symbol of the user illustrated in FIG. 2 described above is mapped in the multi-stream CPDMA based on the frequency hopping pattern is illustrated in detail.

A process of mapping the signal $b^{(i)}$ of the i-th user as a multi-stream symbol $b^{(i,1)}, \ldots, b^{(i,J_i)}$ in order to implement the frequency hopping as the multi-stream CPDMA structure is required. A process of mapping the signal $b^{(i)}$ of the i-th user as the multi-stream symbol $b^{(i,1)}, \ldots, b^{(i,J_i)}$ is represented by the following Equation 6.

$$B^{(i,j)}b^{(i)}=b^{(i,j)}$$ [Equation 6]

Herein, $B^{(i,j)}$ is a block diagonal matrix in which a sub-block matrix is an identical matrix, and a position and a size of the sub-block having the identical matrix may be determined based on the frequency hopping pattern $U^{(i)}$ of the aforementioned Equation 1.

The following Equation 7 is one embodiment for Equation 6.

$$\begin{bmatrix} 0 & 0 & 0 & \ldots & 0 \\ 0 & 1 & 0 & \ldots & 0 \\ 0 & 0 & 1 & \ldots & 0 \\ \vdots & \vdots & \vdots & \ddots & 0 \\ 0 & 0 & 0 & \ldots & 0 \end{bmatrix} \begin{bmatrix} b_1^{(i)} \\ b_2^{(i)} \\ b_3^{(i)} \\ \vdots \\ b_L^{(i)} \end{bmatrix} = \begin{bmatrix} 0 \\ b_2^{(i)} \\ b_3^{(i)} \\ \vdots \\ 0 \end{bmatrix}$$ [Equation 7]

Referring to Equation 7, the signal $b^{(i)}$ of the i-th user may be mapped as the multi-stream symbol $b^{(i,1)}, \ldots, b^{(i,J_i)}$ based on the block diagonal matrix which the sub-block matrix is the identical matrix.

In the embodiment of the present invention, like conventional frequency hopping, orthogonal multiplexing in which signals of many users are not interfered to each other is possible, and may be implemented by properly selecting the frequency hopping pattern $U^{(i)}$ like the aforementioned Equation 1.

The aforementioned Equation 1 defines the frequency hopping pattern LM×LM matrix $U^{(i)}$. Each entry of the matrix has 1 if the signal of the i-th user occupies a k-th frequency bin in a symbol time n, and has 0 if not. When the defined frequency hopping pattern satisfies the following Equation 8, interference between the multiplexing users disappears.

$$u_n^{(i)} \cdot u_n^{(i')} = 0$$ [Equation 8]

Herein, the frequency hopping pattern may be defined as $u_n^{(i)} \triangleq$ ($n^{th}$ column of $U^{(i)}$).

The Equation 8 may mean that signals of the i-th user and a i'-th user are orthogonal to each other at the symbol time n. Accordingly, in the case of using the frequency hopping pattern satisfying the Equation 8, even though the signals of many users are multiplexed at the same time, the interference therebetween may not occur.

In the case of using a method of transmitting and receiving data based on the multi-stream CPDMA according to the embodiment of the present invention, performance by the CPDMA technique may be improved.

A case of generating a frequency hopping signal by the aforementioned method may be assumed. In this case, when the entry number of spectral weighting vector $f^{(i,j)}$ having a non-zero value is larger than L, the frequency hopping signal may have a characteristic of the CPDMA in which data having a L length in the frequency axis are repeated M times. In this case, the transmitted signal has an automatically redundant symbol in the frequency axis and thus may have a characteristic (generation of an interference signal having redundant frequency-axial data, structure) of an existing CPDMA as it is.

Accordingly, in the frequency hopping using the CPDMA structure, when the length of the spectral weighting vector is L or more, performance improvement based on the CPDMA in addition to the performance improvement of the frequency hopping may be achieved. In this case, in order to further improve the performance of the CPDMA, when a non-zero entry length of the spectral weighting vector is selected to be much larger than L, a hoppling space which does not overlap with the frequency axis may be reduced. That is, the performance improvement of the CPDMA and the performance improvement of the frequency hopping may have a trade-off relationship. Accordingly, the performance improvement may be achieved by adaptively controlling two values when transmitting and receiving the data.

Further, in the case of using a method of transmitting and receiving the data based on the multi-stream CPDMA according to the embodiment of the present invention, performance by frequency hopping of a symbol unit may be improved.

A case where symbols of each stream using different frequencies are the same as each other may be assumed. For example, in FIG. 7, a case where $b_3^{(i,1)}$ and $b_4^{(i,2)}$ have the same value may be assumed. In this case, the same symbols use different frequencies at different times to achieve the hopping of symbol unit. Since the entire data transmission rate is reduced as the same symbol is repeated in different streams, in this case, the performance improvement of the frequency hopping of the symbol unit and the data transmission rate may have a trade-off relationship. Accordingly, the performance improvement may be achieved by adaptively controlling two values when transmitting and receiving the data.

Further, in the case of using a method of transmitting and receiving the data based on the multi-stream CPDMA according to the embodiment of the present invention, performance reduction due to a frequency selective characteristic of a channel may be overcome by a simple frequency-axial 1-tap equalizer. When the frequency selective characteristic occurs in the channel by multipath propagation, a bit error rate of the system may be increased. However, in the case of using a method of transmitting and receiving the data based on the multi-stream CPDMA according to the embodiment of the present invention, a block transmission method using a cyclic prefix is used. Accordingly, in the case of using the cyclic prefix longer than a maximum delay spread, a design of the frequency-axial 1-tap equalizer may be very simply implemented, and the performance reduction due to the frequency selective characteristic of the channel may be overcome by using the design.

Figure 8:
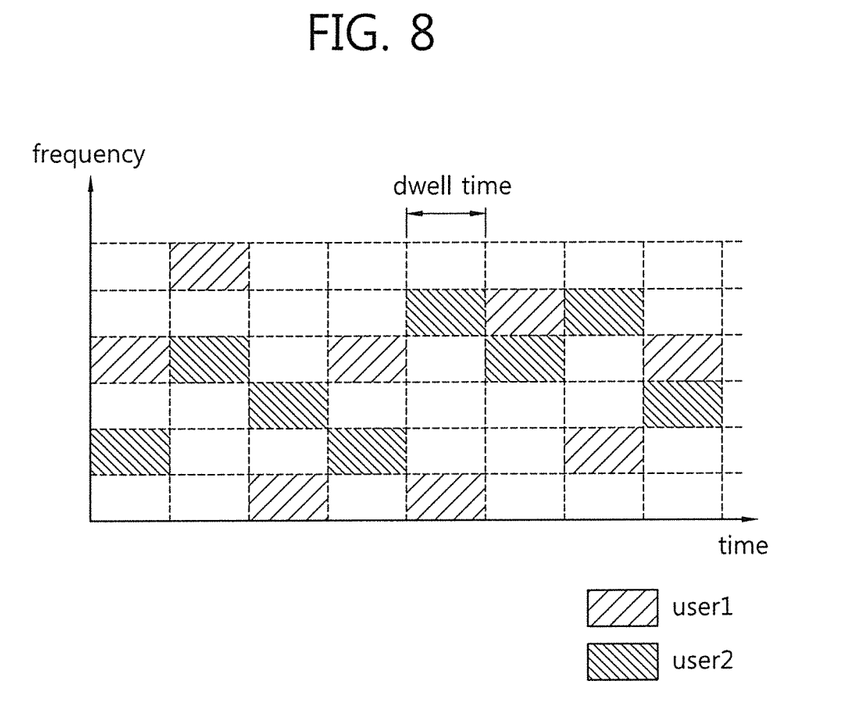
FIG. 8 is a schematic diagram illustrating a dwell time and a hopping sequence of two users which are designed to be perpendicular to each other according to the embodiment of the present invention.

Further, in the case of using a method of transmitting and receiving the data based on the multi-stream CPDMA according to the embodiment of the present invention, frequency-axial multiplexing (FDM) may be simply implemented by controlling the spectral weighting vector. In the frequency hopping signal of the i-th user made by using the multi-stream CPDMA structure, the dwell time and the hopping sequence may be determined by an i-th spectral weighting vector $f^{(i,j)}$, $j=1,2,\ldots,J_{max}$. When the dwell time and the hopping sequence of different users are orthogonal to each other in time-frequency axes, there is no overlapping portion in the frequency area, and as a result, interference between the users disappears.

FIG. 8 is a schematic diagram illustrating a residence time and a hopping sequence of two users which are designed to be perpendicular to each other according to the embodiment of the present invention.

Referring to FIG. 8, it is assumed that two users have the same dwell time, but even if not, different signals are orthogonal to each other in the time-frequency axes, multiplexing without the interference is possible. That is, there is an advantage that only the design of the spectral weighting vector may be easily implemented.

In a receiver, in order to restore an original signal, the non-zero entry length of the spectral weighting vector of each user needs to be at least L or more. By the limitation condition, the maximum number of users which may be multiplexed by the frequency hopping system using the multi-stream CPDMA structure becomes M. In order to increase the bit error performance by adding the redundant data, since there is no choice but to reduce the number of multiplexed users, the performance and the maximum user number have a trade-off relationship.

Figure 9:
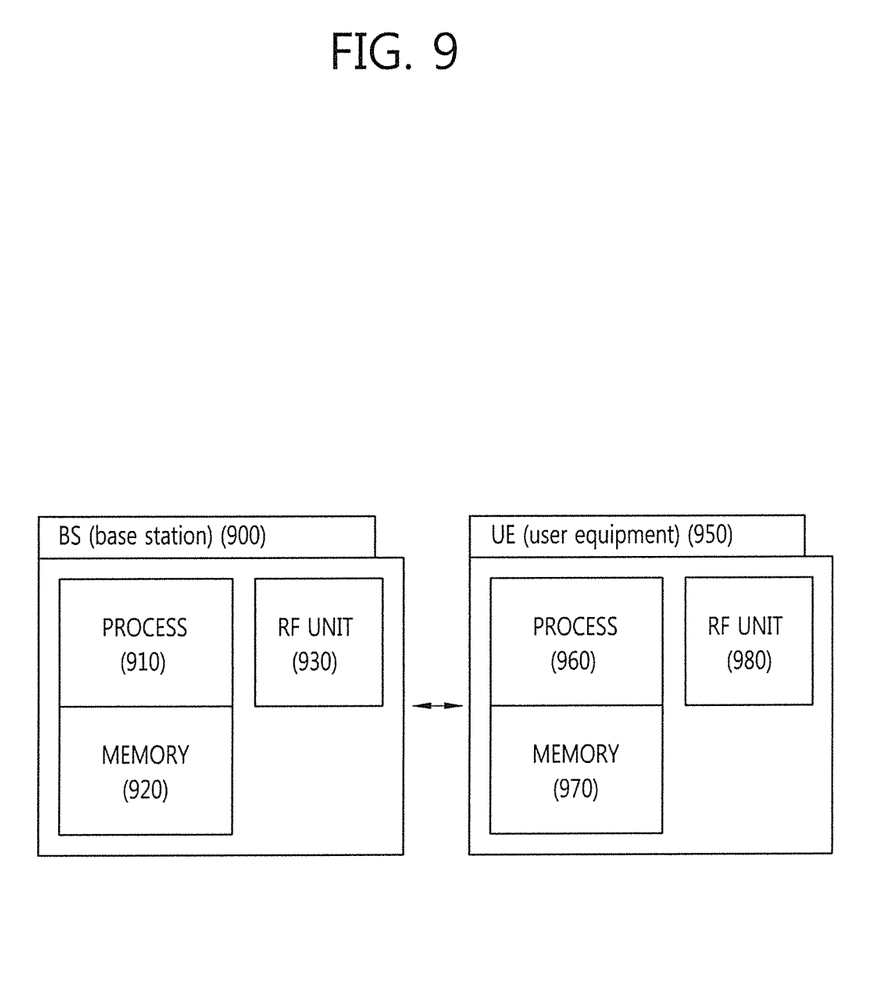
FIG. 9 is a block diagram illustrating a radio communication system according to the embodiment of the present invention.

FIG. 9 is a block diagram illustrating a radio communication system according to the embodiment of the present invention.

Referring to FIG. 9, a base station 900 includes a processor 910, a memory 920, and a radio frequency (RF) unit 930. The memory 920 is connected with the processor 910 to store a variety of information for driving the processor 910. The RF unit 920 is connected with the processor 910 to transmit and/or receive a radio signal. The processor 910 implements the proposed function, process, and/or method. In the aforementioned embodiment, an operation of the base station may be implemented by the processor 910.

Similarly, a user equipment 950 includes a processor 960, a memory 970, and an RF unit 980. The memory 970 is connected with the processor 960 to store a variety of information for driving the processor 960. The RF unit 980 is connected with the processor 960 to transmit and/or receive a radio signal. The processor 960 implements the proposed function, process, and/or method. In the aforementioned embodiment, an operation of the base station may be implemented by the processor 960.

For example, the processors 910 and 960 may transmit and receive the data by using the signal generated based on the multi-stream CPDMA. The processors 910 and 960 allocate a plurality of data symbols to a plurality of data streams based on the frequency hopping pattern, respectively, and a DFT function and a M-times repetition function may be applied to the data symbol allocated to each of the plurality of data streams. Further, the processors 910 and 960 apply the spectral weighting vector to each of the plurality of data streams applying the DFT function and the M-times repetition function, and with respect to the plurality of data streams to which the spectral weighting vector is applied, an IDFT function and a cyclic prefix adding procedure are performed to generate the signal based on the multi-stream CPDMA. The spectral weighting vector may be a vector for determining a frequency band used by each of the plurality of data streams.

The processor may include an application-specific integrated circuit (ASIC), another chip set, and a logic circuit and/or a data processing apparatus. The memory may include a read-only memory (ROM), a random access memory (RAM), a flash memory, a memory card, a storage medium and/or other storage devices. The RF unit may include a baseband circuit for processing a radio signal. When the embodiment is implemented by software, the aforementioned method may be implemented by a module (process, function, and the like) performing the aforementioned function. A module is stored in the memory and may be performed by the processor. The memory may exist inside or outside the processor, and may be connected with the processor as various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method of transmitting a signal based on multi-stream cycle period division multiple access (CPDMA), comprising:
    distributing a plurality of data symbols including in a block to each of a plurality of data streams based on a frequency hopping pattern by a user equipment (UE), the block being a group of the data symbols transmitted on an overlapped time based on the plurality of data streams;
    applying a discrete fourier transform (DFT) function and a M-times repetition function to the data symbol allocated to the each of the plurality of data streams by the UE;
    applying a spectral weighting vector to the each of the plurality of data streams applying the DFT function and the M-times repetition function by the UE;
    generating the signal based on the multi-stream CPDMA by performing an inverse discrete fourier transform (IDFT) function and a cyclic prefix adding procedure with respect to the plurality of data streams to which the spectral weighting vector is applied, by the UE; and
    transmitting the generated signal by the UE,
    wherein the signal has a band-limited feature on a frequency domain and a time-limited feature on a time domain based on the spectral weighting vector,
    wherein the spectral weighting vector is a vector for determining a frequency band and time resource for each of the plurality of data streams,
    wherein the spectral weighting vector is determined based on $f^{(i,j)}=\text{Trunc}(\text{DFT}(\text{Trunc}(\text{IDFT}(g^{(i,j)}),\epsilon)),\epsilon)$, where $\epsilon$ is a truncation threshold value, wherein the $g^{(i,j)}$ is a weighting function for each frequency band applied to each of the plurality of data streams, and wherein the Trunc is $$[Trunc(x, \epsilon)]_1 = \begin{cases} x_1, & x_1 \geq \epsilon \\ 0, & x_1 < \epsilon, \end{cases}$$

where x is a input variable for the Trunc and x1 is a output variable for the Trunc determined based on $\epsilon$.

2. The method of claim 1, wherein
the data symbol distributed to the each of the plurality of data streams is determined based on $B^{(i,j)}b^{(i)} = b^{(i,j)}$,
the $B^{(i,j)}$ is a block diagonal matrix in which a sub-block matrix is an identical matrix, and a position and a size of the sub-block are determined based on the frequency hopping pattern, and
the $b^{(i)}$ is the plurality of data symbols, and
the $b^{(i,j)}$ is the data symbol allocated to a j-th data stream among the plurality of data streams.

3. The method of claim 2, wherein
the frequency hopping pattern has a relationship of $u_n^{(i)} \cdot u_n^{(i')} = 0$ with a frequency hopping pattern of another UE,
the $u_n^{(i)}$ is the frequency hopping pattern, and
the $u_n^{(i')}$ is the frequency hopping pattern of the another UE.

4. The method of claim 3, wherein
a signal based on the multi-stream CPDMA is $d_{CP}^{(i)}[m]$ obtained by adding a cyclic prefix to $$d^{(i)}[m] = W_{LM}^H \left( \sum_{j=1}^{J_i} F^{(i,j)} \Psi_M W_L b^{(i,j)}[m] \right),$$

the $W_{LM}^H$ is the IDFT function, the $F^{(i,j)} = \text{diag}(f^{(i,j)})$, the $\psi_M$ is the M-times repetition function, the $W_L$ is the DFT function, the $b^{(i,j)}$ is the data symbol allocated to the j-th data stream among the plurality of data streams.

5. A user equipment operating in a radio communication network and configured to transmit a signal based on multi-stream cycle period division multiple access (CPDMA), the user equipment comprising:
a radio frequency (RF) unit configured to transmit and receive a radio signal; and
a processor operatively connected with the RF unit and configured to:
distribute a plurality of data symbols including a block to each of a plurality of data streams based on a frequency hopping pattern by a user equipment (UE), the block being a group of the data symbols transmitted on an overlapped time based on the plurality of data streams,
apply a discrete fourier transform (DFT) function and a M-times repetition function to the data symbol allocated to the each of the plurality of data streams by the UE,
apply a spectral weighting vector to the each of the plurality of data streams applying the DFT function and the M-times repetition function by the UE, and
generate the signal based on the multi-stream CPDMA by performing an inverse discrete fourier transform (IDFT) function and a cyclic prefix adding procedure with respect to the plurality of data streams to which the spectral weighting vector is applied, by the UE, and
transmit the generated signal,
wherein the signal has a band-limited feature on a frequency domain and a time-limited feature on a time domain based on the spectral weighting vector,
wherein the spectral weighting vector is a vector for determining a frequency band and a time resource for each of the plurality of data streams,
wherein the spectral weighting vector is determined based on $f^{(i,j)} = \text{Trunc}(\text{DFT}(\text{Trunc}(\text{IDFT}(g^{(i,j)}), \epsilon)), \epsilon)$, where $\epsilon$ is a truncation threshold value,
wherein the $g^{(i,j)}$ is a weighting function for each frequency band applied to each of the plurality of data streams, and
wherein the Trunc is $$[Trunc(x, \epsilon)]_1 = \begin{cases} x_1, & x_1 \geq \epsilon \\ 0, & x_1 < \epsilon, \end{cases}$$

where x is a input variable for the Trunc and x1 is a output variable for the Trunc determined based on $\epsilon$.

6. The user equipment of claim 5, wherein
the data symbol distributed to the each of the plurality of data streams is determined based on $B^{(i,j)}b^{(i)} = b^{(i,j)}$,
the $B^{(i,j)}$ is a block diagonal matrix in which a sub-block matrix is an identical matrix, and a position and a size of the sub-block is determined based on the frequency hopping pattern,
the $b^{(i)}$ is the plurality of data symbols, and
the $b^{(i,j)}$ is a data symbol allocated to a j-th data stream among the plurality of data streams.

7. The user equipment of claim 6, wherein
the frequency hopping pattern has a relationship of $u_n^{(i)} \cdot u_n^{(i')} = 0$ with a frequency hopping pattern of another UE,
the $u_n^{(i)}$ is the frequency hopping pattern, and
the $u_n^{(i')}$ is the frequency hopping pattern of the another UE.

8. The user equipment of claim 7, wherein
the signal based on the multi-stream CPDMA is $d_{CP}^{(i)}[m]$ obtained by adding a cyclic prefix to $$d^{(i)}[m] = W_{LM}^H \left( \sum_{j=1}^{J_i} F^{(i,j)} \Psi_M W_L b^{(i,j)}[m] \right),$$

the $W_{LM}^H$ is the IDFT function, the $\psi_M$, the $F^{(i,j)} = \text{diag}(f^{(i,j)})$, the $\psi_M$ is the M-times repetition function, the $W_L$ is the DFT function, the $b^{(i,j)}$ is the data symbol allocated to the j-th data stream among the plurality of data streams.

* * * * *